(12) United States Patent
Oh et al.

(10) Patent No.: US 9,369,612 B2
(45) Date of Patent: Jun. 14, 2016

(54) IMAGE FUSION SYSTEM AND METHOD

(71) Applicant: HANWHA TECHWIN CO., LTD., Changwon-si (KR)

(72) Inventors: Jae Yoon Oh, Changwon-si (KR); Joon Sung Lee, Changwon-si (KR); Young Seo Park, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 54 days.

(21) Appl. No.: 14/323,494

(22) Filed: Jul. 3, 2014

(65) Prior Publication Data

US 2015/0055886 A1 Feb. 26, 2015

(30) Foreign Application Priority Data

Aug. 20, 2013 (KR) .................. 10-2013-0098609

(51) Int. Cl.
G06K 9/36 (2006.01)
H04N 5/225 (2006.01)
G06T 3/40 (2006.01)
G06T 5/50 (2006.01)
H04N 5/232 (2006.01)
H04N 5/247 (2006.01)
H04N 5/33 (2006.01)

(52) U.S. Cl.
CPC ............ *H04N 5/225* (2013.01); *G06T 3/4038* (2013.01); *G06T 5/50* (2013.01); *H04N 5/23238* (2013.01); *H04N 5/23296* (2013.01); *H04N 5/247* (2013.01); *H04N 5/332* (2013.01); *G06T 2207/10048* (2013.01); *G06T 2207/10052* (2013.01); *G06T 2207/20221* (2013.01)

(58) Field of Classification Search
None
See application file for complete search history.

(56) References Cited

U.S. PATENT DOCUMENTS

| 2004/0021766 A1* | 2/2004 | Daniilidis | H04N 5/332 348/36 |
| 2006/0187312 A1* | 8/2006 | Labaziewicz | H04N 5/225 348/218.1 |
| 2010/0014780 A1* | 1/2010 | Kalayeh | G06T 1/00 382/284 |
| 2014/0005484 A1* | 1/2014 | Charles | A61B 17/02 600/201 |

FOREIGN PATENT DOCUMENTS

| JP | 2005-249723 A | 9/2005 |
| JP | 2009-105764 A | 5/2009 |
| KR | 10-2006-0096708 A | 9/2006 |
| KR | 10-2007-0013512 A | 1/2007 |
| KR | 10-2010-0018998 A | 2/2010 |
| KR | 10-2012-0109057 A | 10/2012 |

* cited by examiner

Primary Examiner — Eueng-Nan Yeh
(74) Attorney, Agent, or Firm — Sughrue Mion, PLLC

(57) ABSTRACT

An image fusion system and method are provided. The system includes a plurality of cameras configured to generate a plurality of images, respectively, and an image fusion unit configured to fuse the plurality of images into a single image.

16 Claims, 11 Drawing Sheets

| Image Select Control(S2) | Output |
|---|---|
| 1 | V |
| 2 | T |
| 3 | R |
| 4 | Pc |
| 5 | V,T |
| 6 | V,R |
| 7 | V,Pc |
| 8 | T,R |
| 9 | T,Pc |
| 10 | R,Pc |
| 12 | V,T,R |
| 13 | V,T,Pc |
| 14 | V,R,Pc |
| 15 | T,R,Pc |
| 16 | V,T,R,Pc |

FIG. 13

| Image Select Control(S3) | Output |
|---|---|
| 1 | V |
| 2 | T |
| 3 | R |
| 4 | Pc |
| 5 | V,T,F |
| 6 | V,R,F |
| 7 | V,Pc,F |
| 8 | T,R,F |
| 9 | T,Pc,F |
| 10 | R,Pc,F |
| 12 | V,T,R,F |
| 13 | V,T,Pc,F |
| 14 | V,R,Pc,F |
| 15 | T,R,Pc,F |
| 16 | V,T,R,Pc,F |

IMAGE FUSION SYSTEM AND METHOD

CROSS-REFERENCE TO RELATED APPLICATION

This application claims priority from Korean Patent Application No. 10-2013-0098609, filed on Aug. 20, 2013, in the Korean Intellectual Property Office, the disclosure of which is incorporated herein in its entirety by reference.

BACKGROUND

1. Field

One or more exemplary embodiments of the inventive concept relate to an image fusion system and method based on a plurality of different types of cameras.

2. Description of the Related Art

Visible light cameras that are used for surveillance systems, e.g., charge-coupled device (CCD) cameras, are technologically advanced and applied in various fields, compared to other types of cameras. However, since CCD cameras may only perform a surveillance function in places with light, CCD cameras may not be used in a surveillance system without lighting. Thermal imaging cameras may be used for surveillance in a dark environment, and in various fields related to heat emission, such as detecting heat loss of a subject or analyzing circuit boards. The thermal imaging cameras may perform a surveillance function only in environments with heat, but not in environments without any heat emission.

SUMMARY

One or more exemplary embodiments of the inventive concept provide an image fusion system and method which are capable of performing optimum surveillance by monitoring captured and then fused images by a plurality of different type cameras.

Various aspects will be set forth in part in the description which follows and, in part, will be apparent from the description, or may be learned by practice of the presented embodiments.

According to an aspect of an exemplary embodiment, there is provided an image fusion system which may include: an image selection unit configured to select at least two images from a plurality of images captured by a plurality of different type cameras; a first matching unit configured to match the selected images by adjusting, based on zoom information about the selected images, aspect ratios of the selected images to be the same as a reference aspect ratio, wherein the aspect ratios are determined according to field of views (FOVs) to capture the selected images, respectively; a second matching unit configured to match the selected images by adjusting resolutions of the selected images to be the same as a reference resolution; a third matching unit configured to match the selected images by applying a mutual geometric relationship between the selected images; and a fusion unit configured to fuse the selected images which are matched by the first to third matching units, and thus generate a fused image.

The second matching unit may be configured to adjust the resolutions of the selected images of which the aspect ratios are adjusted to be the same as the reference aspect ratio, and the third matching may be configured to apply the mutual geometric relationship to the selected images of which the resolutions are adjusted to be the same as the reference resolution.

The plurality of different type cameras may include: a plurality of pan-tilt-zoom (PTZ) cameras, each capturing the same photography area with respective FOVs; and a plurality of omnidirectional cameras arrayed at predetermined intervals such that adjacent portions of photography areas captured by two adjacent cameras of the omnidirectional cameras overlap.

The plurality of PTZ cameras may include a visible light camera configured to generate a visible image, a thermal imaging camera configured to generate a thermal image, and an infrared camera configured to generate an infrared image.

The image selection unit may select the at least two images from among a plurality of images captured by the plurality of PTZ cameras and a cropped image generated by cropping an area corresponding to the plurality of images from a panorama image that is generated by using images captured by the plurality of omnidirectional cameras.

The zoom information about the selected images may include zoom information about the cropped image which is a digital zoom ratio that is converted from a size of the cropped image.

The first matching unit may crop left and right sides of the selected images or performs zero padding on the selected images.

The third matching unit may include: a feature extraction unit configured to detect features of the selected images; a feature matching unit configured to determine one of the selected images as a reference image, and detect matching features between features of the reference image and at least one image other than the reference image; and a conversion function estimation unit configured to estimate conversion functions of the at least one image other than the reference image based on the detected matching features.

The fusion unit may adjust transparency of the selected images by applying a weight to each of the selected images.

The system may further include a multiplexer configured to output at least one of the plurality of images and the fused image.

According to an aspect of another exemplary embodiment, there is provided an image fusion system that may include: a plurality of cameras configured to generate a plurality of images, respectively, and an image fusion unit configured to fuse the plurality of images into a single image, wherein FOVs of the plurality of cameras are set to be the substantially same.

The plurality of cameras may include at least two cameras among a visible light camera, a thermal imaging camera and an infrared light camera.

The image fusion unit may include: a resizing unit configured to control the plurality of images such that respective sizes of the plurality of images are the same; and an information fusion unit configured to extract an object that is not displayed in a visible image captured by the visible light camera but displayed in a thermal image captured by the thermal imaging camera and an object that is not displayed in the visible and thermal images but displayed in an infrared image captured by the infrared light camera, and overlap the thermal image and the infrared image on the visible image so that extracted objects are displayed on the visible image.

According to an aspect of still another exemplary embodiment, there is provided an image fusion method which may include: selecting at least two images from a plurality of images captured by a plurality of different type cameras; first matching the selected images by adjusting, based on zoom information about selected images, aspect ratios of the selected images to be the same as a reference aspect ratio, wherein the aspect ratios are determined according to FOVs to capture the selected images, respectively; second matching the selected images by adjusting resolutions of the selected images to be the same as a reference resolution; third matching the selected images by applying a mutual geometric relationship between the selected images; and fusing the selected images which are matched by the three matchings to generate a fused image.

The second matching may be performed by adjusting the resolutions of the selected images of which the aspect ratios are adjusted to be the same as the reference aspect ratio, and the third matching may be performed by applying the mutual geometric relationship to the selected images of which the resolutions are adjusted to be the same as the reference resolution.

The plurality of different type cameras may include: a PTZ cameras, each capturing the same photography area with respective FOVs; and a plurality of omnidirectional cameras arrayed at predetermined intervals such that adjacent portions of photography areas captured by two adjacent cameras of the omnidirectional cameras overlap, wherein the plurality of PTZ cameras may include a visible light camera generating a visible image, a thermal imaging camera generating a thermal image, and an infrared light camera generating an infrared image.

The selecting the at least two images may include selecting at least two images from among a plurality of images captured by the plurality of PTZ cameras and a cropped image generated by cropping an area corresponding to the plurality of images from a panorama image that is generated by using images captured by the plurality of omnidirectional cameras.

The zoom information about the selected images may include zoom information about the cropped image which is a digital zoom ratio that is converted from a size of the cropped image.

The adjusting aspect ratios may include cropping left and right sides of the selected images or zero padding on the selected images.

The third matching may include: detecting features of the selected images; determining one of the selected images as a reference image and detecting matching features between features of the reference image and at least one image other than the reference image; and estimating conversion functions of the at least one image other than the reference image based on the detected matching features.

The fusing may include adjusting transparency of the selected images by applying a weight to each of the selected images.

The system may further include outputting at least one of the plurality of images and the fused image.

According to an aspect of still another exemplary embodiment, there is provided an image fusion method which may include: generating a visible image that displays brightness distribution of an object by using a visible light camera in a first FOV; generating a thermal image that displays temperature information about the object by using a thermal imaging camera that is controlled such that an FOV thereof is the same as an FOV of the visible light camera; generating an infrared image that is received by emitting infrared light on the object by using an infrared light camera that is controlled such that an FOV thereof is the same as the FOV of the visible light camera and the thermal imaging camera; and fusing the visible image, the thermal image, and the infrared image into a single image.

The fusing the images may include controlling the visible image, the thermal image, and the infrared image such that respective sizes of the visible image, the thermal image, and the infrared image are the same.

The fusing the images may include extracting an object that is not displayed in the visible image but displayed in the thermal image; extracting an object that is not displayed in the visible image and the thermal image but displayed in the infrared image; and overlapping the thermal image and the infrared image on the visible image so that extracted objects are displayed on the visible image.

BRIEF DESCRIPTION OF THE DRAWINGS

These and/or other aspects will become apparent and more readily appreciated from the following description of the exemplary embodiments, taken in conjunction with the accompanying drawings, in which:

FIG. 13 is an example of combinations of images to be selected by a multiplexer according to an image selection signal.

DETAILED DESCRIPTION OF EXEMPLARY EMBODIMENTS

Figure 1:
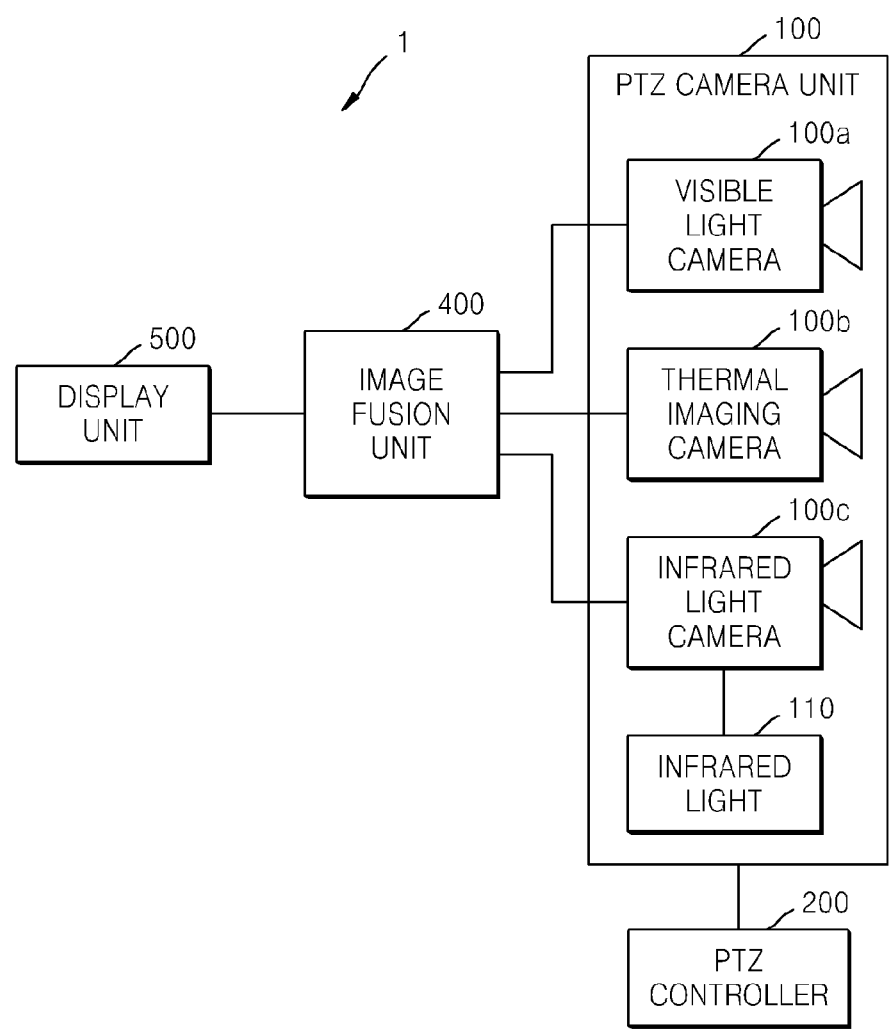
FIG. 1 is a block diagram of an image fusion system according to an exemplary embodiment.

While the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the present application. In the description of the exemplary embodiments, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the invention may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Hereinafter, reference will now be made in detail to the exemplary embodiments, in which like reference numerals refer to like elements throughout. Expressions such as "at least one of," when preceding a list of elements, modify the entire list of elements and do not modify the individual elements of the list.

FIG. 1 is a block diagram of an image fusion system 1, according to an exemplary embodiment.

Referring to FIG. 1, the image fusion system 1 according to the present embodiment includes a pan-tilt-zoom (PTZ) camera unit 100, a PTZ controller 200, an image fusion unit 400, and a display unit 500.

The PTZ camera unit 100 includes a visible light camera 100a, a thermal imaging camera 100b, and an infrared light camera 100c that includes an infrared light 110. The visible light camera 100a, the thermal imaging camera 100b, and the infrared light camera 100c may pan, i.e., horizontally rotate in 360°, by using a built-in fan motor (not shown); tilt, i.e., vertically rotate in 90° or more, by using a built-in tilt motor (not shown); and zoom, i.e., enlarge or reduce an image of a subject. The panning, tilting, and zooming operations of the visible light camera 100a, the thermal imaging camera 100b, and the infrared light camera 100c may be controlled by the PTZ controller 200.

The PTZ controller 200 may control a zoom lens such that the visible light camera 100a, the thermal imaging camera 100b, and the infrared light camera 100c capture the same photography area. The photographing of the same photography area by these three cameras may be performed in the same field of view (FOV). That is, these three cameras may have the same FOV with respect to the same photography area. However, since the three cameras may not be positioned at the exactly same position at the same time, the FOVs with respect to the same photography area may not be exactly the same, and instead, may be substantially the same enough to generate a fused image as describe later with respect to the same photography area.

The visible light camera 100a is a surveillance camera that obtains image information by detecting light, and thus, generates a visible image according to brightness distribution of an object. The visible light camera 100a is used to monitor objects in visible light areas, like the human eyes. For example, the visible light camera 100a may be a charge-coupled device (CCD) camera using a CCD as an imaging device. The visible light camera 100a may be installed inside or outside public facilities that need to be monitored, such as offices, houses, hospitals, or banks, and thus, be used for controlling access or security. Depending on its place of installation and purpose of use, the visible light camera 100a may have various forms, such as a straight line form or a dome-like form. In the exemplary embodiments described herein, the "object" is a term that includes a background and a subject.

Under a given photography condition, the visible light camera 100a provides excellent sensitivity and high-resolution images. An image sensor of the visible light camera 100a has a relatively wide dynamic range compared to other sensors.

The thermal imaging camera 100b detects radiant energy (thermal energy) emitted from an object in an infrared light wavelength form, which is a type of electromagnetic wave, estimates the intensity of thermal energy, and thus, generates different colored thermal images according to the intensity of thermal energy. In a thermal image, a surface of the object is mapped and shown in different colors depending on temperatures of the surface.

Although the thermal imaging camera 100b may capture an image of the object even in an environment without light, it is difficult to recognize the object in an image captured by the thermal imaging camera 100b because a resolution of the thermal imaging camera 100b is lower than that of the visible light camera 100a.

The infrared light camera 100c detects a light area between about 300 nm to about 700 nm, and thus, includes a light sensor that detects infrared light areas that may not be recognized by the human eyes. Therefore, the infrared light camera 100c may capture dark places or through thin materials. The infrared light camera 100c captures an object by emitting the infrared light 110, e.g., an infrared light-emitting diode (IR-LED), and then, receiving infrared light that is reflected from the object.

The PTZ controller 200 controls the zoom lens such that the visible light camera 100a, the thermal imaging camera 100b, and the infrared light camera 100c capture images in the same FOV. Since a size of a sensor and a focal length per zoom sections of a zoom lens may vary in each camera, it is necessary to accurately control the zoom lens such that the images captured by the visible light camera 100a, the thermal imaging camera 100b, and the infrared light camera 100c have the same FOV.

The image fusion unit 400 performs signal processing, i.e., outputting a received image signal as a signal that satisfies a display standard. The image fusion unit 400 fuses a visible image that is output from the visible light camera 100a, a thermal image that is output from the thermal imaging camera 100, and an infrared image that is output from the infrared light camera 100c. The visible light camera 100a may not show an object in a dark place, the thermal imaging camera 100b may show an object emitting heat but may not show an object not emitting heat in a place without light, and the infrared light camera 100c may show an object not emitting heat in a place without light. The image fusion unit 400 may display an image of an object by appropriately employing strengths and weaknesses of the visible light camera 100*a*, the thermal imaging camera 100*b*, and the infrared light camera 100*c*.

The image fusion unit 400 fuses a visible image that is output from the visible light camera 100*a*, a thermal image that is output from the thermal imaging camera 100*b*, and an infrared image that is output from the infrared light camera 100*c*. The image fusion unit 400 compares the visible image and the thermal image to thus extract an object that is not displayed in the visible image but is displayed in the thermal image. Also, the image fusion unit 400 compares the visible image, the thermal image, and the infrared image to thus extract an object that is not displayed in the visible image and the thermal image but is displayed in the infrared image. The image fusion unit 400 overlaps the thermal image and the infrared image on the visible image so that the extracted objects are displayed in the visible image. When extracting objects, the image fusion unit 400 may determine respective sizes and locations of the objects.

The display unit 500 processes a video signal, which is output from the image fusion unit 400 by fusing the visible image, the thermal image, and the infrared image, and thus provides the video signal to a user so that the user may monitor a displayed image. The display unit 500 displays a fused image that is generated by overlapping the thermal image and the infrared image on the visible image. The display unit 500 may be configured of a liquid crystal display (LCD) panel, an organic light-emitting display (OLED) panel, or an electrophoretic display (EPD) panel. The display unit 500 may be configured as a touch screen so that a user may input by touching, and thus function as a user input interface.

In the present embodiment, the PTZ camera unit 100 includes three different types of camera, that is, the visible light camera 100*a*, the thermal imaging camera 100*b*, and the infrared light camera 100*c*. However, the inventive concept is not limited to this embodiment. According to another exemplary embodiment, the PTZ camera unit 100 may include more or less than three different types of camera.

Figure 2:
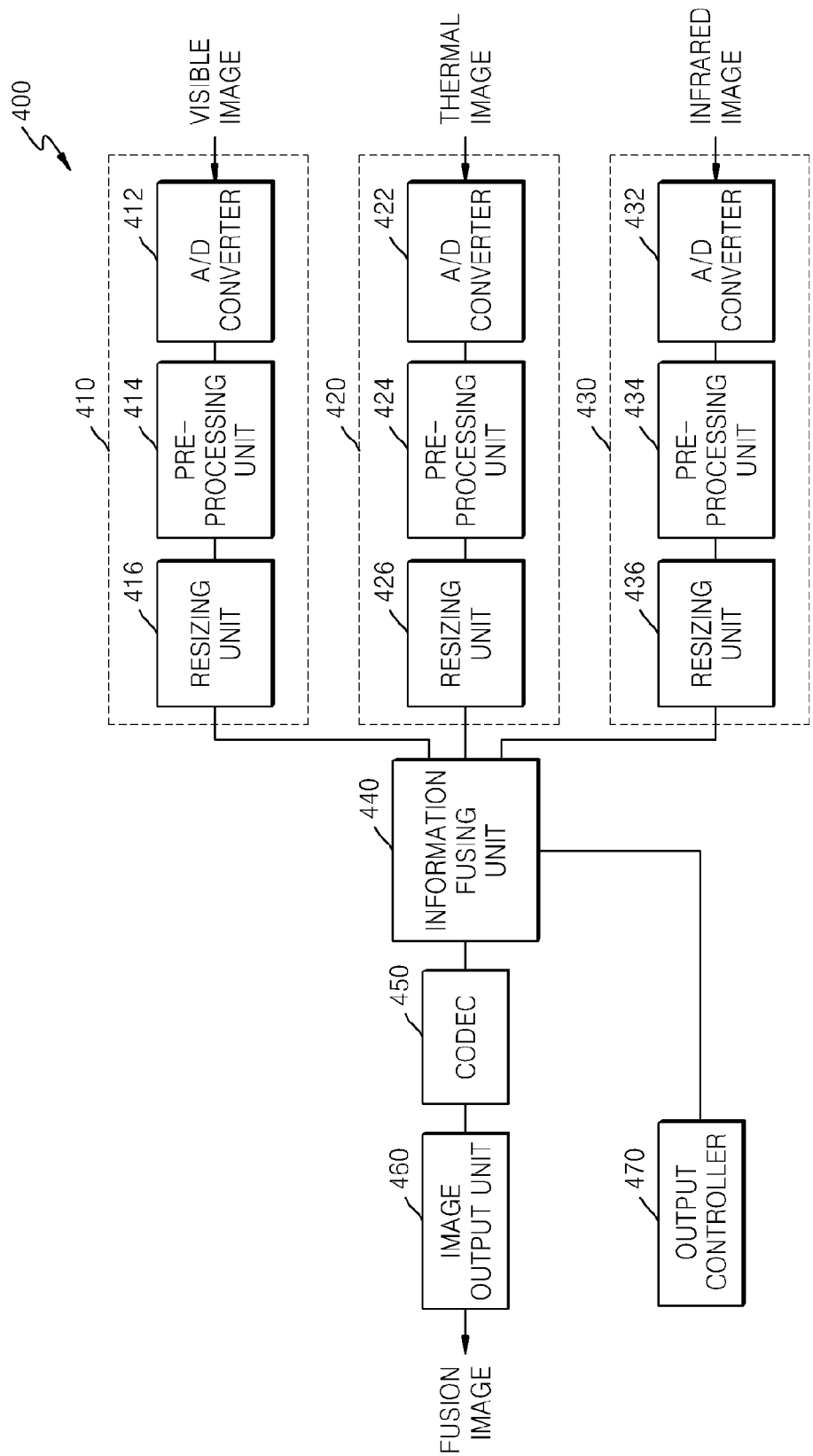
FIG. 2 is a block diagram of an image fusion unit according to an exemplary embodiment.

FIG. 2 is a block diagram of the image fusion unit 400, according to an exemplary embodiment.

Referring to FIG. 2, the image fusion unit 400 includes a visible image processing unit 410, a thermal image processing unit 420, an infrared image processing unit 430, an information fusion unit 440, a codec 450, an image output unit 460, and an output controller 470.

The visible image processing unit 410 includes an analog/digital (A/D) converter 412, a pre-processing unit 414, and a resizing unit 416.

The A/D converter 412 processes an analog visible image signal, which is received from a visible light camera, so as to remove noise and adjust amplitude, and then, converts the analog visible image signal into digital image data.

The pre-processing unit 414 performs pre-processing for processing images, such as normalization of the digital image data.

The resizing unit 416 resizes the visible image such that the visible image and the thermal image have the same size and may match each other. The resizing unit 416 performs pixel interpolation to resize. Various methods, such as a linear interpolation method, may be used to perform pixel interpolation.

The thermal image processing unit 420 includes an A/D converter 422, a pre-processing unit 424, and a resizing unit 426.

The A/D converter 422 processes an analog thermal image signal, which is received from a thermal imaging camera, so as to remove noise and adjust amplitude, and then, converts the analog thermal image signal into digital image data.

The pre-processing unit 424 performs pre-processing for processing images, such as normalization of the digital image data.

The resizing unit 426 resizes the thermal image such that the visible image and the thermal image have the same size and may match each other. The resizing unit 426 performs pixel interpolation to resize. Various methods, such as a linear interpolation method, may be used to perform pixel interpolation. Since the number of pixels of the thermal image is generally less than that of the visible image, the pixels of the thermal image may be interpolated such that the thermal image has the same size as the visible image.

The infrared image processing unit 430 includes an A/D converter 432, a pre-processing unit 434, and a resizing unit 436.

The A/D converter 432 processes an analog infrared image signal, which is received from an infrared light camera, so as to remove noise and adjust amplitude, and then, converts the analog infrared image signal into digital image data.

The pre-processing unit 434 performs pre-processing for processing images, such as normalization of the digital image data.

The resizing unit 436 resizes the infrared image such that the visible image, the thermal image, and the infrared image have the same size and may match each other. The resizing unit 426 performs pixel interpolation to resize. Various methods, such as a linear interpolation method, may be used to perform pixel interpolation.

The information fusion unit 440 fuses a digital visible image, a digital thermal image, and a digital infrared image having the same size. The information fusion unit 440 compares the visible image and the thermal image to thus extract an object that is not displayed in the visible image but is displayed in the thermal image. Also, the information fusion unit 440 compares the visible image, the thermal image, and the infrared image to thus extract an object that is not displayed in the visible image and the thermal image but is displayed in the infrared image. Then, the information fusion unit 440 overlaps the thermal image and the infrared image on the visible image so that the extracted objects are displayed in the visible image.

The codec 450 codes a video signal generated at the information fusing unit by fusing the visible image, the infrared image and the thermal image, and outputs to the image output unit the coded video signal as a single image.

The output controller 470 controls types of images, that is, the video signal, that are output by the information fusion unit 440. Also, the output controller 470 controls outputs of the visible light camera 100*a*, the thermal imaging camera 100*b*, and the infrared light camera 100*c*.

Figure 3:
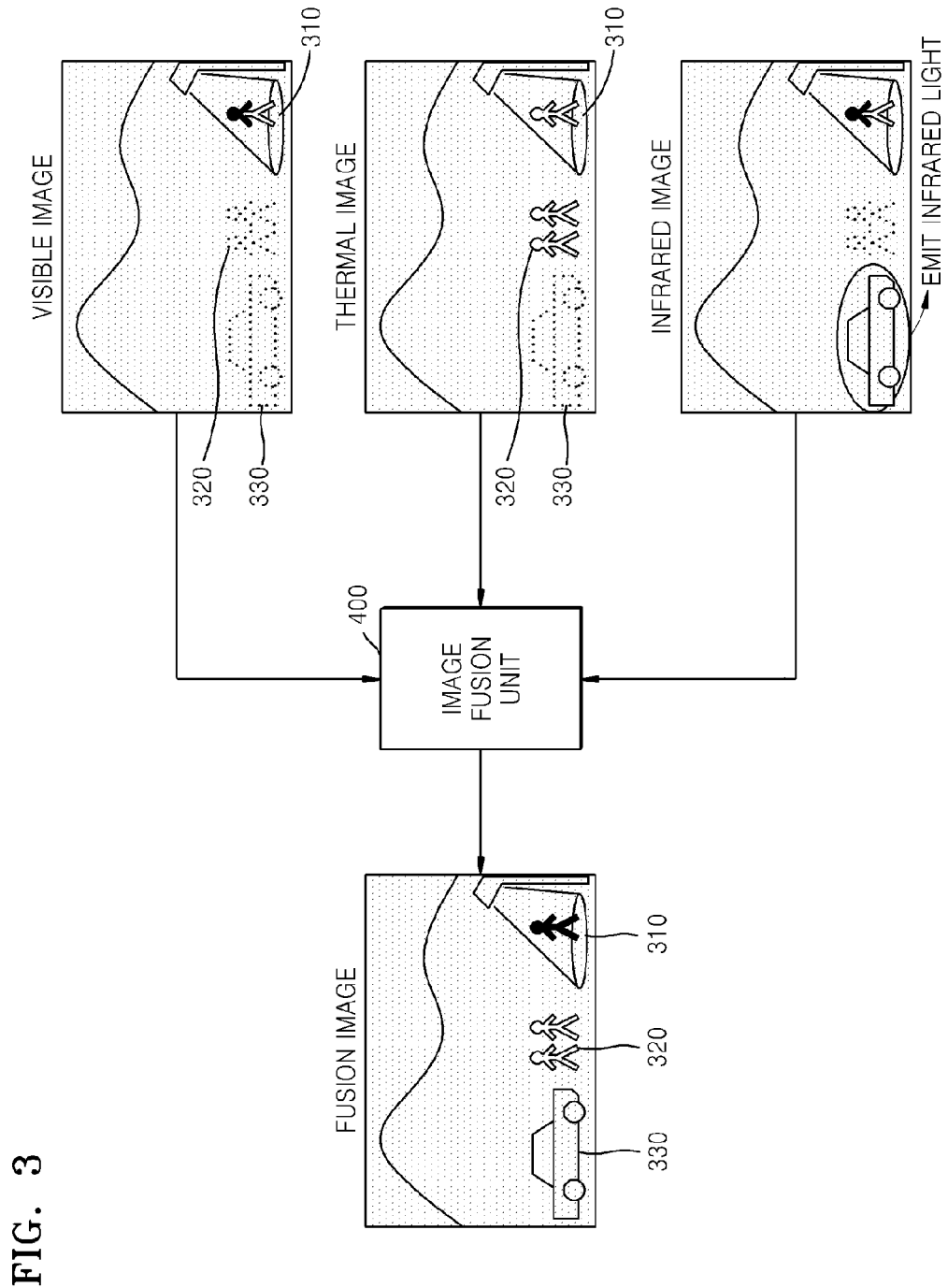
FIG. 3 is a view of an image fusion screen according to an exemplary embodiment.

FIG. 3 is a view of an image fusion screen according to an exemplary embodiment.

FIG. 3 shows an image which is captured by the visible light camera 100*a* and shows an object 310 on which light is shone; an image which is captured by the thermal imaging camera 100*b* and shows an object 320 emitting heat; and an image which is captured by the infrared light camera 100*c* and shows an object 330 emitting reflected infrared light.

The image fusion unit 400 extracts the objects 310, 320, and 330 that are respectively shown in the visible image, the thermal image and the infrared image, overlaps the thermal image and the infrared image on the visible image to thus generate a fused image in which the objects 310, 320, and 330 are displayed, and then, outputs the fused image by using the display unit 500 shown in FIG. 1.

An optimum surveillance is realized by fusing and monitoring images captured by a visible light camera, a thermal imaging camera, and an infrared light camera in the same FOV such that there are no areas that are not photographed.

Hereinafter, an image fusion method according to an exemplary embodiment will be described with reference to FIG. 4. The image fusion method according to an exemplary embodiment may be executed in an image fusion system as shown in FIGS. 1 and 2. Features that have been already described with reference to FIGS. 1 to 3 will not be described again.

Figure 4:
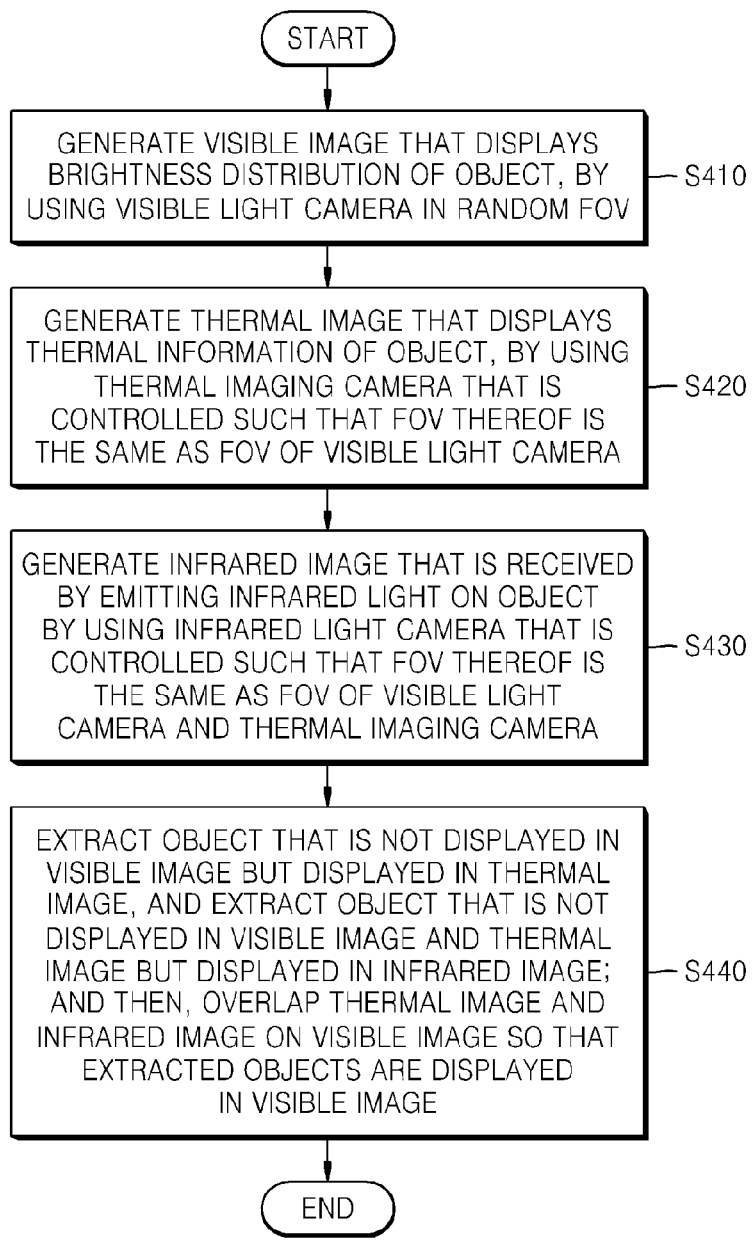
FIG. 4 is a flowchart of an image fusion method, according to an exemplary embodiment.

Referring to FIG. 4, the visible light camera 100a generates a visible image that displays brightness distribution of an object in a given FOV (S410).

The thermal imaging camera 100b is controlled such that an FOV thereof is the same as an FOV of the visible light camera 100a, and generates a thermal image that displays temperature information about the object (S420).

The infrared light camera 100c is controlled such that an FOV thereof is the same as those of the visible light camera 100a and the thermal imaging camera 100b, and generates an infrared image that is generated by emitting infrared light on the object and then receiving the reflected infrared light from the object (S430).

The image fusion unit 400 receives and then fuses the visible image, the thermal image, and the infrared image (S440). The image fusion unit 400 converts the visible image, the thermal image, and the infrared image into digital image data; performs pre-processing for processing images, such as normalization; and then, resizes the visible image, the thermal image, and the infrared image such that they have the same size and may match each other. Then, the image fusion unit 400 compares the visible image and the thermal image to thus extract an object that is not displayed in the visible image but is displayed in the thermal image; and also, compares the visible image, the thermal image, and the infrared image to thus extract an object that is not displayed in the visible image and the thermal image but is displayed in the infrared image. When extracting objects, the image fusion unit 400 may determine respective sizes and locations of the objects. The image fusion unit 400 overlaps the thermal image and the infrared image on the visible image so that the extracted objects are displayed in the visible image.

Figure 5:
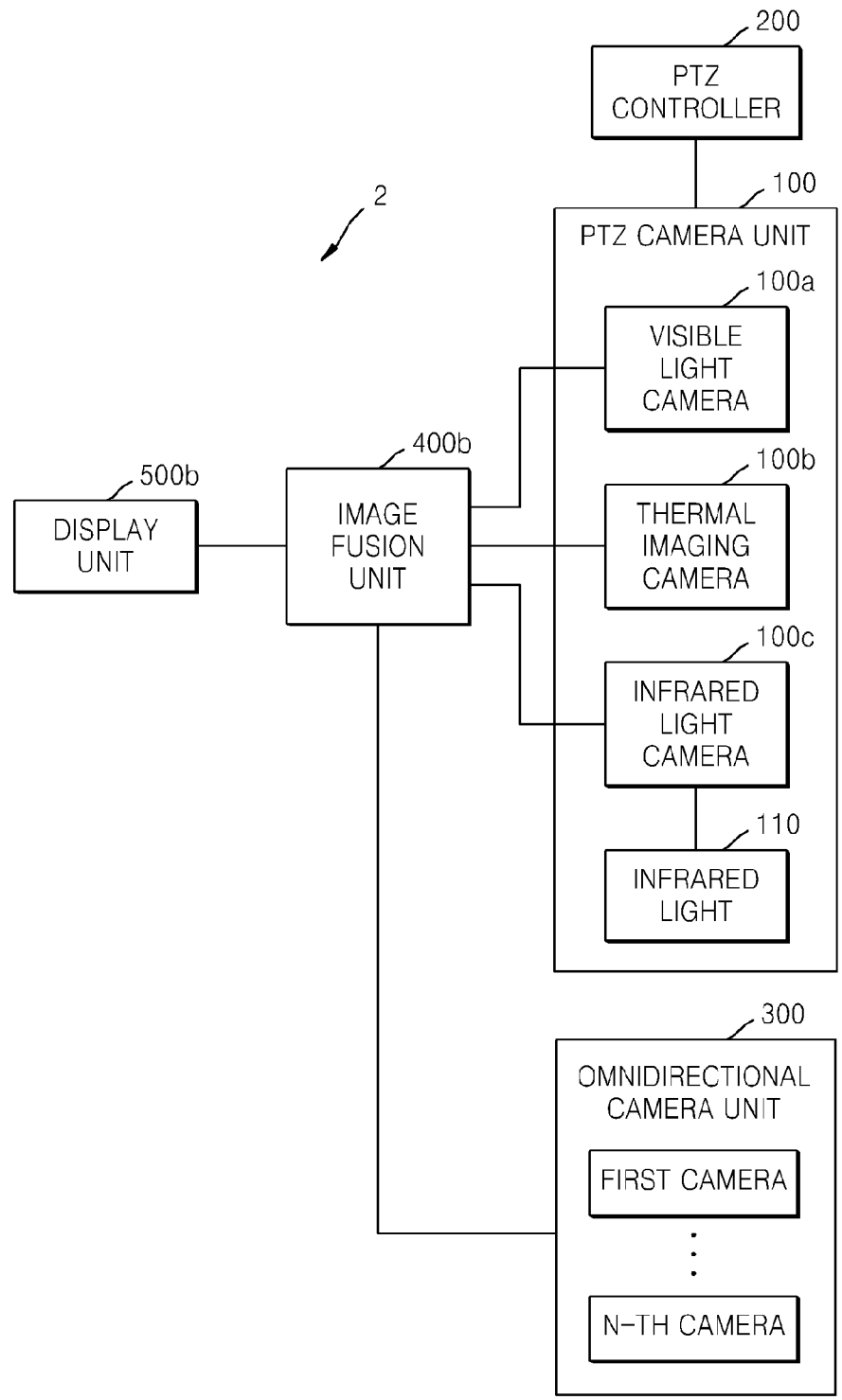
FIG. 5 is a block diagram of an image fusion system according to another exemplary embodiment.

FIG. 5 is a block diagram of an image fusion system 2 according to another exemplary embodiment.

Referring to FIG. 5, the image fusion system 2 according to the present embodiment includes a PTZ camera unit 100, a PTZ controller 200, an omnidirectional camera unit 300, an image fusion unit 400b, and a display unit 500b.

The embodiment shown in FIG. 5 is different from the embodiment shown in FIG. 1 in that the omnidirectional camera unit 300 is additionally included and that respective FOVs of PTZ cameras in the PTZ camera unit 100 are not the same. Hereinafter, the difference between the embodiments of FIGS. 1 and 5 will be mainly described.

The PTZ camera unit 100 includes a visible light camera 100a, a thermal imaging camera 100b, and an infrared light camera 100c that includes an infrared light 110.

The PTZ controller 200 may control a zoom lens such that the visible light camera 100a, the thermal imaging camera 100b, and the infrared light camera 100c capture the same photography area in respectively determined FOVs. Accordingly, images respectively captured by the visible light camera 100a, the thermal imaging camera 100b, and the infrared light camera 100c may have different FOVs. The visible light camera 100a, the thermal imaging camera 100b, and the infrared light camera 100c capture images in the respectively determined FOVs, and output images having aspect ratios and resolutions that correspond to the respectively determined FOVs to the image fusion unit 400b.

The omnidirectional camera unit 300 may include a plurality of first to n-th cameras. The plurality of first to n-th cameras are provided in a protection device (housing) and arranged horizontally and circularly, i.e., spaced apart at predetermined intervals and arrayed in a radial form. The plurality of first to n-th cameras are fixed in the protection device and only capture front portions of a predetermined area. If necessary, the plurality of first to n-th cameras may be provided without the protection device.

The plurality of first to n-th cameras capture the front portions in respectively determined FOVs. The number of first to n-th cameras for capturing in all directions, i.e., 360°, may be determined according to the respectively determined FOVs. In this case, FOVs of adjacent cameras are determined such that the FOVs overlap each other by predetermined areas. The plurality of first to n-th cameras output images captured in the respectively determined FOVs to the image fusion unit 400b.

The image fusion unit 400b may fuses at least two of a visible image that is output from the visible light camera 100a, a thermal image that is output from the thermal imaging camera 100b, an infrared image that is output from the infrared light camera 100c, and a panorama image that is generated by images output from the omnidirectional camera unit 300.

The display unit 500b provides at least one of the visible image, the thermal image, the infrared image, the panorama image, and a fused image, which are output from the image fusion unit 400b, to the user so that the user may monitor a displayed image.

Figure 6:
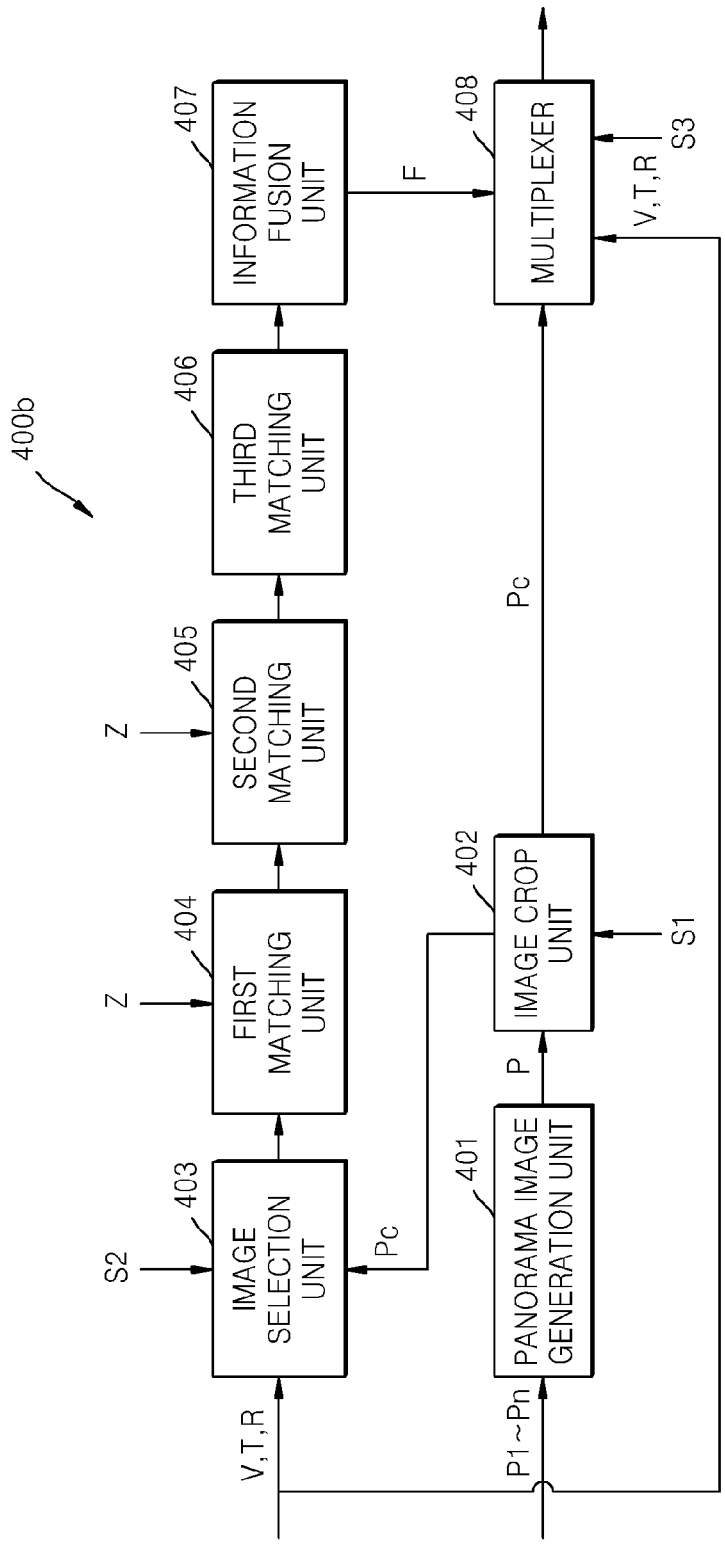
FIG. 6 is a block diagram of an image fusion unit of FIG. 5, according to an exemplary embodiment.
Figure 7:
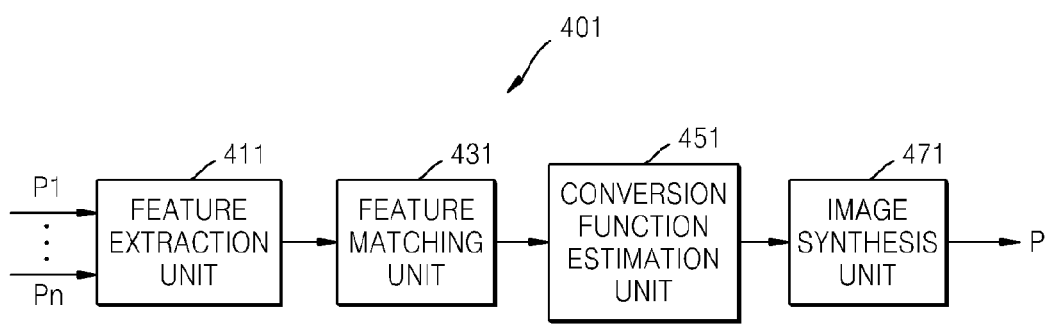
FIG. 7 is a block diagram of a panorama image generation unit of FIG. 6, according to an exemplary embodiment.
Figure 8:
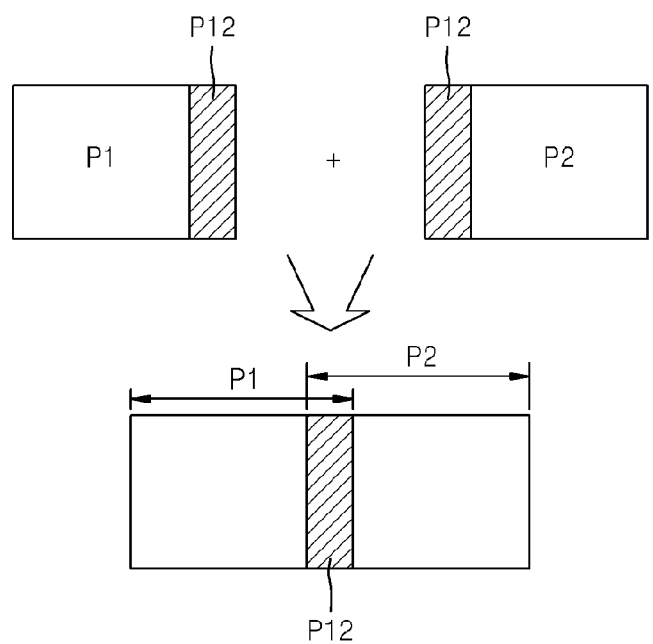
FIGS. 8 and 9 are views for describing a method of generating a panorama image, according to an exemplary embodiment.
Figures 9, 10:
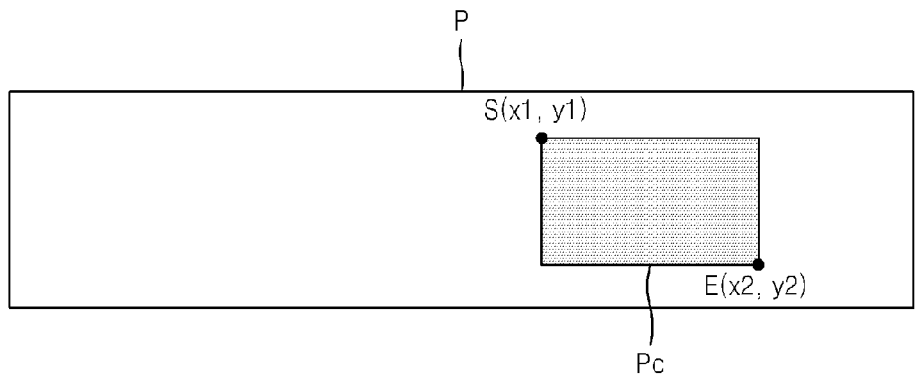
FIG. 10 is an example of combinations of images to be selected by an image selection unit according to an image selection signal.

FIG. 6 is a block diagram of the image fusion unit 400b of FIG. 5, according to an exemplary embodiment. FIG. 7 is a block diagram of a panorama image generation unit 401 of FIG. 6, according to an exemplary embodiment. FIGS. 8 and 9 are views for describing a method of generating a panorama image, according to an exemplary embodiment.

Referring to FIG. 6, the image fusion unit 400b may include the panorama image generation unit 401, an image crop unit 402, an image selection unit 403, a first matching unit 404, a second matching unit 405, a third matching unit 406, an information fusion unit 407, and a multiplexer 408.

Also referring to FIG. 7, the panorama image generation unit 401 may include a feature extraction unit 411, a feature matching unit 431, a conversion function estimation unit 451, and an image fusion unit 471.

The feature extraction unit 411 receives captured images P1 to Pn from the plurality of first to n-th cameras of the omnidirectional camera unit 300 and extracts features from each captured image.

The feature matching unit 431 detects respective features from two adjacent captured images.

The conversion function estimation unit 451 estimates a conversion function by using the respective features of the two adjacent captured images.

The image fusion unit 471 warps and then synthesizes two adjacent captured images from among the captured images P1 to Pn by using the estimated conversion function, and thus generates a panorama image P. For example, as illustrated in FIG. 8, the image fusion unit 471 may warp a first captured image P1 and a second captured image P2 that are adjacent to each other by using the conversion function, and synthesize the first and second captured images P1 and P2 such that there is an overlapping area P12. An omnidirectional image, i.e., the panorama image P, may be generated by sequentially warping and synthesizing the captured images P1 to Pn as described above.

The image crop unit 402 may crop a desired area in the panorama image P. The PTZ controller 200 generates a location selection control signal S1 based on panning and tilting information of the PTZ camera unit 100. As illustrated in FIG. 9, the location selection control signal S1 includes coordinates of a start point S(x1, y1) and an end point E(x2, y2) in the panorama image P to be cropped. The image crop unit 402 receives the location selection control signal S1, crops a block corresponding to the coordinates of the starting and end points, and then outputs a cropped image Pc.

The image selection unit 403 receives the cropped image Pc from the image crop unit 402, and respectively receives a visible image V, a thermal image T, and an infrared image R from the visible light camera 100*a*, the thermal imaging camera 100*b*, and the infrared light camera 100*c*, respectively.

The image selection unit 403 receives an image selection signal S2, and according to the image selection signal S2, selects images to be fused from among the visible image V, the thermal image T, the infrared image R, and the cropped image Pc. FIG. 10 is an example of combinations of images to be selected by the image selection unit 403 according to the image selection signal S2. The example of FIG. 10 shows combinations of one to four selected images among the four types of input images. When only one image is selected, the selected image may be displayed on the display unit 500*b* without a fusing process. The image selection signal S2 may be provided from a controller (not shown) of the image fusion system 2.

The visible image V, the thermal image T, and the infrared image R received in the image selection unit 403, and the captured images P1 to Pn received in the panorama image generation unit 401 may be images that are A/D converted and pre-processed by using an A/D converter and a pre-processing unit, as illustrated in FIG. 2.

The first matching unit 404 equalizes FOVs of selected images that are output by the image selection unit 403. The first matching unit 404 may detect an FOV of each image based on zoom information Z of the selected images. Zoom information about the visible image V, the thermal image T, and the infrared image R may include zoom ratios of the zoom lens and digital zoom ratios. Zoom information about the cropped image Pc may include a digital zoom ratio that is converted from a size of the cropped image Pc. An aspect ratio of an image may be determined according to an FOV. The zoom information Z may be provided from a controller (not shown) of the image fusion system 2 which is connected to the PTZ controller 200 and the omnidirectional camera unit 300.

The first matching unit 404 may adjust an aspect ratio of each image, which corresponds to the detected FOV, to be the same as a reference aspect ratio. When an aspect ratio of a selected image is greater than the reference aspect ratio, the first matching unit 404 may crop left and right sides of the selected image so that the aspect ratio of the selected image matches the reference aspect ratio. When the aspect ratio of the selected image is smaller than the reference aspect ratio, the first matching unit 404 may perform interpolation or zero padding so that the aspect ratio of the selected image matches the reference aspect ratio. The reference aspect ratio may be an aspect ratio of any one of the selected images, or a predetermined aspect ratio that is determined by the user.

Figure 11:
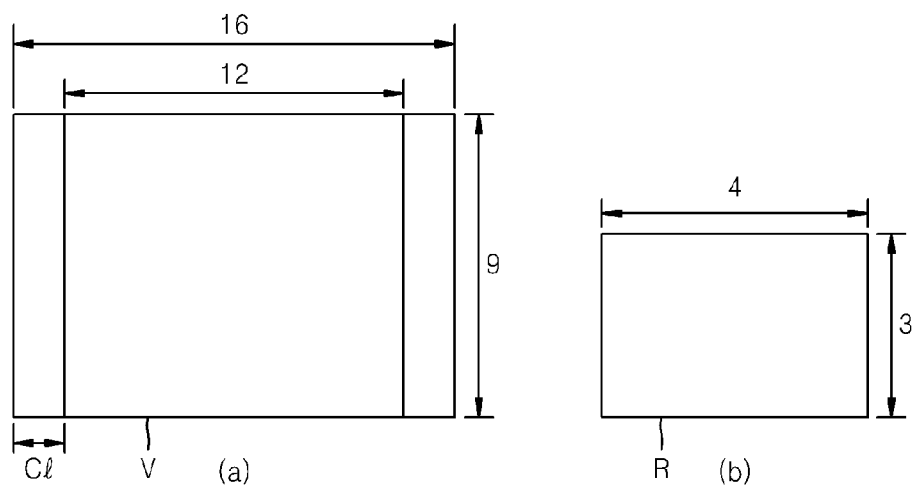
FIG. 11 is a view for describing an example of adjusting an aspect ratio, according to an exemplary embodiment.

FIG. 11 is a view for describing an example of adjusting an aspect ratio, according to an exemplary embodiment. Referring to FIG. 11, selected images are the visible image V and the infrared image R, and a reference aspect ratio is an aspect ratio of the infrared image R. The aspect ratio of the infrared image R is 4:3, and an aspect ratio of the visible image V is 16:9. The first matching unit 404 may adjust the aspect ratio of the visible image V to equal 4:3 by cropping left and right sides of the visible image V by a crop length Cl.

Based on the zoom information Z, the second matching unit 405 equalizes resolutions of the selected images, which have equalized FOVs (or aspect ratios) and are output by the first matching unit 404. The second matching unit 405 may adjust the resolutions of the selected images to be the same as a reference resolution. The reference resolution may be a resolution of any one of the selected images, or a predetermined resolution that is determined by the user. The second matching unit 405 may resize the selected images to have the same size by equalizing the resolutions of the selected images so that pixels of the selected images may be matched 1:1 with one another. The second matching unit 405 may correspond to a resizing unit of FIG. 2. When the smallest resolution is determined as the reference resolution, resolution conversion may be performed at a high speed and fewer resources may be used.

Figure 12:
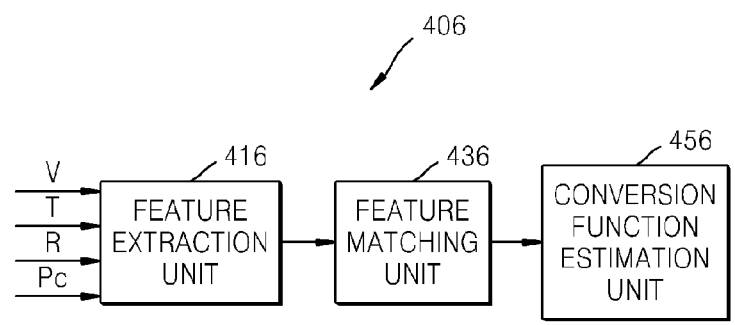
FIG. 12 is a block diagram of a third registration unit according to an exemplary embodiment.

The third matching unit 406 matches the selected images that are adjusted based on the reference resolution by using a mutual geometric relationship. The mutual geometric relationship may be expressed by using the conversion function. FIG. 12 is a block diagram of the third matching unit 406 according to an exemplary embodiment. The third matching unit 406 may include a feature extraction unit 416, a feature matching unit 436, and a conversion function estimation unit 456.

The feature extraction unit 416 detects features of the selected images. The feature extraction unit 416 may be provided separately for each fusible image (e.g., four feature extraction units for detecting respective features of the visible image V, the thermal image T, the infrared image R, and the cropped image Pc). Alternatively, the feature extraction unit 416 may be integrally provided and thus detect the features of the selected image sequentially or in parallel. The feature extraction unit 416 may extract corners, edges, contours, line intersections, etc. from first and second images as features by using a scale invariant feature transform (SIFT) algorithm, a HARRIS corner detection algorithm, a SUSAN algorithm, and the like. According to the present embodiments, a feature extraction algorithm is not limited to the above-described examples, and various feature extraction algorithms may be used.

The feature matching unit 436 may detect matching features between the respective features of the selected images. The feature matching unit 436 may determine one of the selected images as a reference image and detect matching features between the reference image and images other than the reference image. The feature matching unit 436 may determine similarities among the features by using normalized mutual information and gradient direction information as a parameter, and thus detect the matching features. The normalized mutual information is obtained by normalizing mutual information that shows statistical correlation between two probability variables. Since the normalized mutual information and the gradient direction information may be estimated by using algorithms and well-known methods in the art, detailed descriptions thereof will be omitted in the detailed description of the present embodiment.

The conversion function estimation unit 456 may estimate a conversion function H based on the detected matching features. As in Equation 1, the conversion function estimation unit 456 may estimate the conversion function H by using a random sample consensus (RANSAC) algorithm or a locally optimized RANSAC (LO-RANSAC) algorithm. The conversion function estimation unit 456 may estimate a conversion function between the reference image and the images other than the reference image.

$$H = \begin{pmatrix} h_{11} & h_{12} & h_{13} \\ h_{21} & h_{22} & h_{23} \\ h_{31} & h_{32} & h_{33} \end{pmatrix} \quad (1)$$

The elements (h11 to h33) of the conversion function H includes rotation information regarding a rotation angle; translation information about a moving distance in the direction of x, y and z; and scaling information about a degree of scale in the direction of x, y and z.

The information fusion unit 407 may generate a fused image F by fusing the matched images. The information fusion unit 407 may overlap the selected images and adjust the intensity (transparency) of each image. The information fusion unit 407 may adjust the transparency by applying an intensity weight to each image or pixels of each image.

The multiplexer 408 may select and output at least one of the fused image F, the visible image V, the thermal image T, the infrared image R, and the cropped image Pc. The multiplexer 408 receives an image selection signal S3, and according to the image selection signal S3, selects at least one of the fused image F, the visible image V, the thermal image T, the infrared image R, and the cropped image Pc. FIG. 13 is an example of combinations of images to be selected by the multiplexer 408 according to the image selection signal S3. The example of FIG. 13 shows combinations of one to five selected images among the five types of input images. A selected image may be displayed on the display unit 500*b*. The image selection signal S2 may be provided from a controller (not shown) of the image fusion system 2.

Although not illustrated, the information fusion unit 407 may code fused images by using a codec as shown in FIG. 2.

In the present embodiment, the images selected at the image selection unit 403 are matched at the first to third matching units 404-406 in this order. However, the inventive concept is not limited thereto, and thus, the image matching may be performed in a different order at the first to third matching units 404-406, according to an exemplary embodiment.

Figure 14:
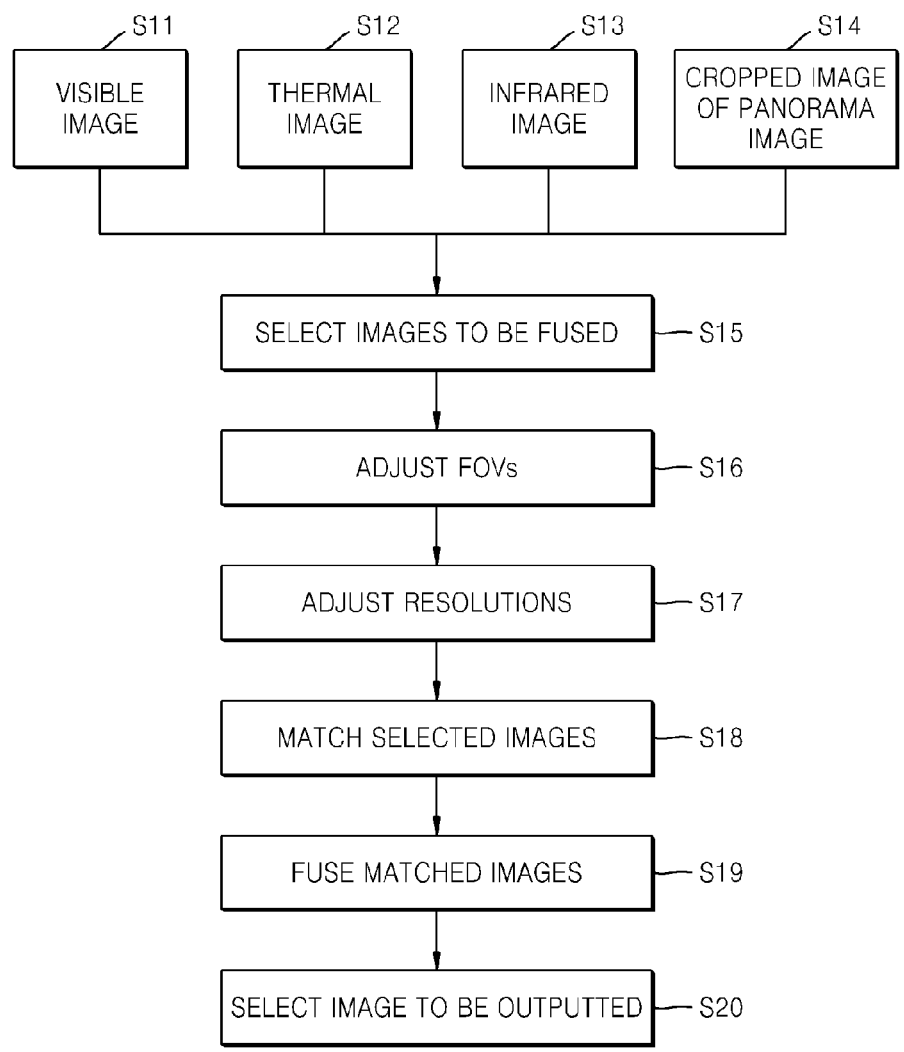
FIG. 14 is a flowchart of an image fusion method according to an exemplary embodiment.

FIG. 14 is a flowchart of an image fusion method according to an exemplary embodiment.

The visible light camera 100*a* generates a visible image that displays brightness distribution of an object in a first FOV (S11). The thermal imaging camera 100*b* generates a thermal image that displays temperature information about the object in a second FOV (S12). The infrared light camera 100*c* generates an infrared image that is generated by emitting infrared light on the object and then receiving the reflected infrared light from the object in a third FOV (S13). The image fusion unit 400*b* generates a panorama image by synthesizing images received from an omnidirectional camera unit 300 including a plurality of first to n-th cameras and generates a cropped image of the panorama image by cropping an area corresponding to areas captured by the visible light camera 100*a*, the thermal imaging camera 100*b*, and the infrared light camera 100 (S14).

From among the visible image, the thermal image, the infrared image, and the cropped image, the image fusion unit 400*b* may select at least two images to fuse (S15). When only one image is selected, the selected image may be displayed without a fusing process.

The image fusion unit 400*b* may adjust FOVs of the selected images (S16). The image fusion unit 400*b* may detect the FOVs of the selected images based on zoom information of the selected images and adjust aspect ratios that correspond to the FOVs of the selected images to be the same as a reference aspect ratio. The zoom information may include a zoom ratio of a zoom lens, a digital zoom ratio, and a zoom ratio that is converted from an image size.

The image fusion unit 400*b* may adjust resolutions of the selected images (S17). Based on the zoom information, the image fusion unit 400*b* may resize the selected images that are adjusted according to the reference aspect ratio, and thus the resolutions of the selected images may be adjusted to be the same as a reference resolution. Therefore, the number of pixels of the selected images may be the same.

The image fusion unit 400*b* may match the selected images that are adjusted based on the reference resolution by using a mutual geometric relationship (S18). The image fusion unit 400*b* may estimate a conversion function by matching features of the selected images, and by using the estimated conversion function, the image fusion unit 400*b* may arrange images other than a reference image with respect to the reference image, and then warp the images.

The image fusion unit 400*b* may generate a fused image by fusing the matched images (S19). In the fused image, a transparency of each of the selected images may be adjusted by applying a weight to each image.

The image fusion unit 400*b* may select at least one of the fused image, the visible image, the thermal image, the infrared image, and the cropped image, and output the selected image to the display unit 500*b* (S20).

The image fusion system and method according to the above embodiments may be used for various purposes such as monitoring security areas like a general outpost (GOP), monitoring areas where 24-hour surveillance is necessary, e.g., in mountains to monitor fire, monitoring trespassing of buildings and residential areas with a low amount of light or no light, tracking a missing person or a criminal in a mountain, and medical imaging.

As described above, according to the above exemplary embodiments, an optimum surveillance may be performed by monitoring the fused images from the captured images by a plurality of different types of cameras.

The inventive concept can also be embodied as computer-readable codes on a computer-readable recording medium. The computer-readable recording medium is any data storage device that can store data which can thereafter be read by a computer system.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributive manner. Also, functional programs, codes, and code segments for accomplishing the present invention can be easily construed by programmers skilled in the art to which the inventive concept pertains.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An image fusion system comprising:
at least one processor configured to implement:
an image selection unit configured to select at least two images from a plurality of images captured by a plurality of different type cameras;
a first matching unit configured to match the selected images by adjusting, based on zoom information about the selected images, aspect ratios of the selected images to be the same as a reference aspect ratio, wherein the aspect ratios are determined according to field of views (FOVs) to capture the selected images, respectively;
a second matching unit configured to match the selected images by adjusting resolutions of the selected images to be the same as a reference resolution;
a third matching unit configured to match the selected images by applying a mutual geometric relationship between the selected images; and
a fusion unit configured to fuse the selected images which are matched by the first to third matching units, and thus generate a fused image,
wherein the second matching unit is configured to adjust the resolutions of the selected images of which the aspect ratios are adjusted to be the same as the reference aspect ratio, and
wherein the third matching is configured to apply the mutual geometric relationship to the selected images of which the resolutions are adjusted to be the same as the reference resolution.

2. The system of claim 1, wherein the plurality of different type cameras comprise:
a plurality of pan-tilt-zoom (PTZ) cameras, each capturing the same photography area with respective FOVs; and
a plurality of omnidirectional cameras arrayed at predetermined intervals such that adjacent portions of photography areas captured by two adjacent cameras of the omnidirectional cameras overlap.

3. The system of claim 2, wherein the plurality of PTZ cameras comprise:
a visible light camera configured to generate a visible image;
a thermal imaging camera configured to generate a thermal image; and
an infrared camera configured to generate an infrared image.

4. The system of claim 2, wherein the image selection unit selects the at least two images from among a plurality of images captured by the plurality of PTZ cameras and a cropped image generated by cropping an area corresponding to the plurality of images from a panorama image that is generated by using images captured by the plurality of omnidirectional cameras.

5. The system of claim 4, wherein the zoom information about the selected images includes zoom information about the cropped image which is a digital zoom ratio that is converted from a size of the cropped image.

6. The system of claim 1, wherein the first matching unit crops left and right sides of the selected images or performs zero padding on the selected images.

7. The system of claim 1, wherein the third matching unit comprises:
a feature extraction unit configured to detect features of the selected images;
a feature matching unit configured to determine one of the selected images as a reference image, and detect matching features between features of the reference image and at least one image other than the reference image; and
a conversion function estimation unit configured to estimate conversion functions of the at least one image other than the reference image based on the detected matching features.

8. The system of claim 1, wherein the fusion unit adjusts transparency of the selected images by applying a weight to each of the selected images.

9. The system of claim 1, wherein the processor is configured to further implement a multiplexer configured to output at least one of the plurality of images and the fused image.

10. An image fusion system comprising:
a plurality of cameras configured to generate a plurality of images, respectively; and
at least one processor configured to implement an image fusion unit configured to fuse the plurality of images into a single image,
wherein fields of views (FOVs) of the plurality of cameras are set to be the substantially same,
wherein the plurality of cameras include at least two cameras among a visible light camera, a thermal imaging camera and an infrared light camera, and
wherein the image fusion unit comprises:
a resizing unit configured to control the plurality of images such that respective sizes of the plurality of images are the same; and
an information fusion unit configured to extract an object that is not displayed in a visible image captured by the visible light camera but displayed in a thermal image captured by the thermal imaging camera and an object that is not displayed in the visible and thermal images but displayed in an infrared image captured by the infrared light camera, and overlap the thermal image and the infrared image on the visible image so that extracted objects are displayed on the visible image.

11. An image fusion method comprising:
selecting at least two images from a plurality of images captured by a plurality of different type cameras; first matching the selected images by adjusting, based on zoom information about selected images, aspect ratios of the selected images to be the same as a reference aspect ratio, wherein the aspect ratios are determined according to field of views (FOVs) to capture the selected images, respectively;
second matching the selected images by adjusting resolutions of the selected images to be the same as a reference resolution;
third matching the selected images by applying a mutual geometric relationship between the selected images; and
fusing the selected images which are matched by the three matchings to generate a fused image,
wherein the second matching is performed by adjusting the resolutions of the selected images of which the aspect ratios are adjusted to be the same as the reference aspect ratio, and
wherein the third matching is performed by applying the mutual geometric relationship to the selected images of which the resolutions are adjusted to be the same as the reference resolution.

12. The method of claim 11, wherein the plurality of different type cameras comprises:
- a plurality of pan-tilt-zoom (PTZ) cameras, each capturing the same photography area with respective FOVs; and
- a plurality of omnidirectional cameras arrayed at predetermined intervals such that adjacent portions of photography areas captured by two adjacent cameras of the omnidirectional cameras overlap, and wherein the plurality of PTZ cameras comprise a visible light camera generating a visible image, a thermal imaging camera generating a thermal image, and an infrared light camera generating an infrared image.

13. The method of claim 12, wherein the selecting the at least two images comprises selecting at least two images from among a plurality of images captured by the plurality of PTZ cameras and a cropped image generated by cropping an area corresponding to the plurality of images from a panorama image that is generated by using images captured by the plurality of omnidirectional cameras.

14. The method of claim 13, wherein the zoom information about the selected images includes zoom information about the cropped image which is a digital zoom ratio that is converted from a size of the cropped image.

15. The method of claim 11, wherein the third matching comprises:
- detecting features of the selected images;
- determining one of the selected images as a reference image and detecting matching features between features of the reference image and at least one image other than the reference image; and
- estimating conversion functions of the at least one image other than the reference image based on the detected matching features.

16. The method of claim 11, wherein the fusing comprises adjusting transparency of the selected images by applying a weight to each of the selected images.

* * * * *